UNITED STATES PATENT OFFICE.

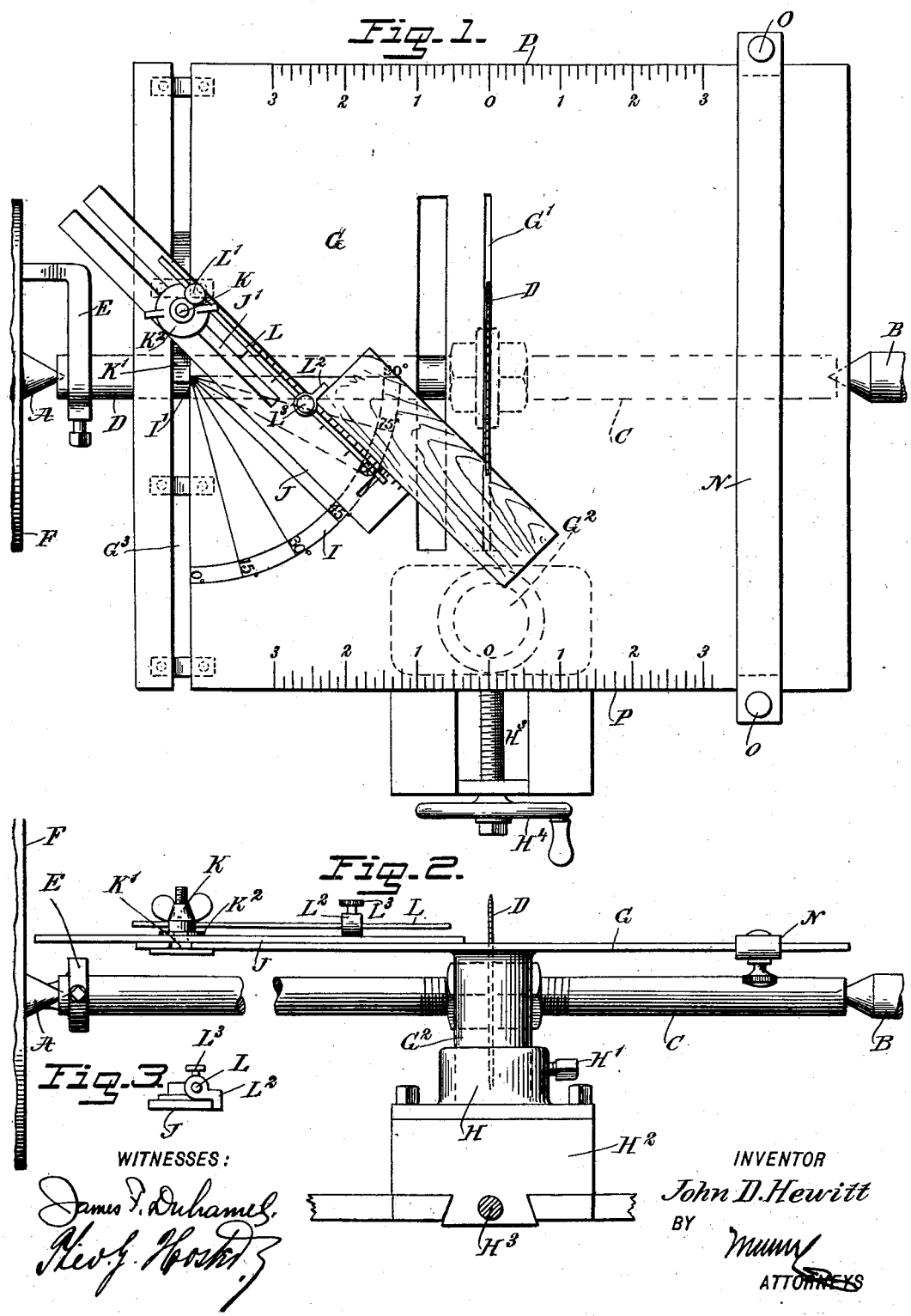

JOHN D. HEWITT, OF BROOKLYN, NEW YORK.

LATHE ATTACHMENT.

SPECIFICATION forming part of Letters Patent No. 701,724, dated June 3, 1902.

Application filed December 6, 1901. Serial No. 84,910. (No model.)

*To all whom it may concern:*

Be it known that I, JOHN D. HEWITT, a citizen of the United States, and a resident of the city of New York, borough of Brooklyn, in the county of Kings and State of New York, have invented a new and Improved Lathe Attachment, of which the following is a full, clear, and exact description.

The object of the invention is to provide a new and improved lathe attachment arranged to permit of using the lathe for sawing wood, soft metal, and the like in such a manner that tongues, grooves, slots, miters, &c., are readily and accurately formed.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the figures.

Figure 1 is a plan view of the improvement as applied. Fig. 2 is a front elevation of the same, and Fig. 3 is an end elevation of the stop.

A lathe of any approved construction is provided with the usual driven head-stock spindle A and the tail center B, supporting an arbor C, carrying a circular saw D, said arbor being connected either by a dog E with a face-plate F, or being directly secured to a chuck on the spindle A, so that when the lathe is rotated a rotary motion is given to the arbor C and its circular saw D. The latter extends through a slot G' in the table G, provided at its forward end with a depending stem $G^2$, secured in a socket H by a set-screw H', said socket being part of the tool-holder $H^2$, mounted to slide transversely on the lathe-carriage by means of a screw-rod $H^3$, provided at its front end with a handle $H^4$, under the control of the operator.

On the top of the table G is permanently formed a quadrant or protractor I, the center I' of which extends in a vertical plane, passing through the axis of the arbor C, said plane also extending through the ninety-degree line on the protractor, as will be readily understood by reference to Fig. 1. On the top of the table G is also arranged a gage-bar J, provided with a slot J', engaged by a clamping-screw K, held on a slide K', engaging a guideway $G^3$, arranged transversely on the table G to allow of shifting the slide K' in said guideway to move the gage-bar J in the same direction to feed the work held on the front edge of the gage-bar transversely to the saw D for the latter to cut the work at an angle corresponding to that to which the gage-bar is set on the protractor I. It is understood that when the gage-bar J has been adjusted to a desired degree it is fastened in place on the slide K' by the clamping-screw K, and wood or metal can then be placed on the forward edge of said gage-bar J to hold the material at a desired angle relative to the plane of rotation of the saw D.

A stop-bar L extends over the gage-bar J, and this stop-bar is held on a head L', secured to the top washer $K^2$ of the clamping-screw K, and on said stop-bar L is longitudinally adjustable a stop $L^2$, fastened in position by a set-screw $L^3$. Thus the work to be sawed and held against the forward edge of the gage-bar J is moved against the stop $L^2$, so as to bring the work in the desired position relative to the saw.

When the material is in position against the gage-bar K and stop $L^2$, the operator slides the slide K', the gage-bar J, and the work thereon transversely by hand, or the operator may turn the handle $H^4$, so as to move the table G, with the work thereon, in a transverse direction to cause the saw D to make the desired cut in the work. By this arrangement any desired cut can be given to the work, it being understood that the gage-bar J is correspondingly adjusted on the protractor I, according to the angle at which the cut is to stand. On the table G is also adjustably held a transversely-extending gage-bar N, arranged parallel to the plane of rotation of the saw D, said gage-bar N being adjusted the desired distance from either face of the saw D by moving the gage-bar along to the right or the left of the saw on graduations P, formed on the top of the table near the front and rear edges thereof. Clamping-screws O serve to fasten the gage-bar N in position on the table after the gage-bar is adjusted a desired distance from either face of the saw D.

The device is very simple and durable in construction and can be readily attached to the tool-post of any lathe, so that the table is in proper position relative to the saw, and the gage-bars J and N can be readily adjusted on the table, according to the cuts to be made by the saw D. By having the stem $G^2$ engage the socket H the stem, and with it the table G, can be raised or lowered for making cuts of a desired depth in the under side of the material, it being understood that the vertical adjustment of the table G changes the position of the latter relative to the top of the saw D for making cuts of a greater or less depth.

Having thus described my invention, I claim as new and desire to secure by Letters Patent—

1. A lathe attachment, comprising a table, an arbor carrying a circular saw and driven from the lathe-spindle, the saw extending through a slot in the table, a protractor on the table, a gage adjustable on the table and adapted to be set to any desired angle on the said protractor, to bring the gage at the desired angle relative to the plane of rotation of the saw, and a slide movable transversely on the said table and carrying the said gage-bar, as set forth.

2. A lathe attachment, comprising a table having a depending stem for adjustment in the socket of the tool-post and movable transversely on the machine, an arbor carrying a circular saw and driven from the lathe-spindle, the saw extending through a slot in the table, a protractor on said table, a gage-bar adjustable on the table and adapted to be set to any angle on the said protractor, to hold the gage-bar at the desired angle relative to the plane of rotation of the saw, and an adjustable stop on said gage-bar, as set forth.

In witness whereof I have signed my name in the presence of two subscribing witnesses.

JOHN D. HEWITT.

Witnesses:
ALICE P. HEWITT,
S. W. ANDERSON.